United States Patent

[11] 3,619,424

[72] Inventors Alain Blanchard;
  Andre Rio; Gilbert Vivant, all of Lyon, France
[21] Appl. No. 864,186
[22] Filed Oct. 6, 1969
[45] Patented Nov. 9, 1971
[73] Assignee Rhone-Poulenc S.A.
  Paris, France
[32] Priority Oct. 7, 1968
[33] France
[31] 168,986

[54] SEMIPERMEABLE MEMBRANES
  8 Claims, No Drawings
[52] U.S. Cl. .................................................. 210/23, 210/500
[51] Int. Cl. ................................................... B01d 13/00
[50] Field of Search ........................................ 210/22, 23, 321, 500

[56] References Cited
UNITED STATES PATENTS

| | | | |
|---|---|---|---|
| 2,252,554 | 12/1941 | Carothers.................... | 210/500 X |
| 3,063,966 | 11/1962 | Kwolek et al. ................ | 260/32.4 X |
| 3,220,960 | 11/1965 | Wichterle et al. ............ | 260/2.5 |

*Primary Examiner*—Frank A. Spear, Jr.
*Attorney*—Stevens, Davis, Miller & Mosher

ABSTRACT: Polyamides of diamines with amino-isophthalic acid make semipermeable membranes of good stability and salt rejection.

SEMIPERMEABLE MEMBRANES

The present invention relates to semipermeable membranes based on polyamides and their use in direct osmosis and reverse osmosis. Polyamides that per se are chemically similar are described and claimed in an earlier application of one of us (Rio) filed on Sept. 16, 1969, Ser. No. 858,508.

Semipermeable membranes are permeable to solvents and impermeable or of low permeability to solutes when they are brought into contact with a solution. Depending on the conditions under which they are used, semipermeable membranes can find two types of applications, namely direct osmosis or reverse osmosis. Thus, if an aqueous solution of a salt is brought into contact with one face of a semipermeable membrane of which the other face is in contact with pure water, it is found that the pure water passes through the membrane and dilutes the saline solution, giving rise to the phenomenon of direct osmosis. If a pressure greater than that required to stop the passage of pure water into the saline water is applied to the saline solution, that pressure being called the osmotic pressure, it is found that the direction of flow of the water is reversed; the water diffuses across the membrane carrying no solute, or practically no solute, with it, depending on the capacity of the membrane to stop the solute. This is reverse osmosis, and it is utilized for separating a solvent from a solute and more especially for desalinating sea water.

The most extensively used semipermeable membranes are based on cellulose derivatives such as cellulose esters and ethers and especially cellulose acetate and ethoxycellulose. These membranes suffer from disadvantages inherent in their chemical nature. In effect, their working life is limited because of their sensitivity to hydrolysis, which is particularly troublesome when they are applied to the desalination of sea water. Furthermore it has been found that the semipermeability of cellulosic membranes is an optimum when they are stored in water, which complicates their storage.

The present invention provides novel semipermeable membranes which have good resistance to hydrolysis and which can be stored dry, made from polyamides or copolyamides containing a plurality of units of the formula:

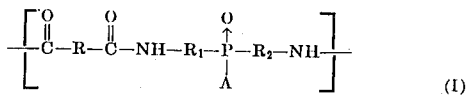

(I)

in which R, $R_1$ and $R_2$ are the same or different divalent hydrocarbon radicals and A represents a hydroxyl group, a monovalent hydrocarbon radical, a lower alkoxy group or a group of formula:

(II)

in which R' and R", which may be the same or different, represent hydrogen atoms or monovalent hydrocarbon radicals. More specifically, R may be an alkylene radical of two to 10 carbon atoms such as ethylene, trimethylene, tetramethylene, pentamethylene or hexamethylene, a cycloalkylene radical such as a 1,4-cyclohexylene radical, or an arylene radical such as an o-, m- or p-phenylene radical. $R_1$ and $R_2$ may be alkylene radials of one to 10 carbon atoms such as methylene, ethylene, triethylene or hexamethylene, a cycloalkylene radical, e.g. cyclohexylene, or an arylene radical such as an o-, m- or p-phenylene radical, optionally substituted by halogen or an alkyl radical such as methyl or ethyl. A can represent alkyl of one to 10 carbon atoms such as methyl, ethyl or butyl, a cycloalkyl group such as cyclopentyl or cyclohexyl, aryl such as phenyl, alkylaryl such as tolyl, or an aralkyl group such as benzyl. Where A is a lower alkoxy group, it can represent a methoxy, ethoxy, propoxy or butoxy group. R' and R" represent alkyl radicals of one to 10 carbon atoms, especially methyl, ethyl or propyl.

The polyamides containing units of formula (I) in which A is a hydroxyl group or a hydrocarbon group are prepared by polycondensation, in accordance with the usual methods, of one or more diacids of the formula:

$$HOOC-R-COOH \quad (III)$$

in which R has the significance given above, or of an anhydride or a chloride of such a diacid, with one or more diamines of the formula:

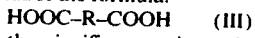
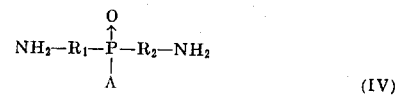

(IV)

in which $R_1$ and $R_2$ have the significance given above and A is a hydroxyl group or a hydrocarbon radical, optionally associated with a diamine which does not contain phosphorus, e.g. of the formula:

$$H_2N-R_3-NH_2 \quad (v)$$

in which $R_3$ is a divalent aliphatic or aromatic group such as hexamethylene, m- or p-phenylene or a radical of the formula:

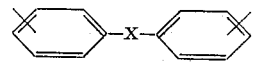

where X is oxygen or methylene.

Examples of diacids of formula (III) are succinic, adipic, cyclohexane-1,4-dicarboxylic, ortho-phthalic, isophthalic and terephthalic acids, these acids may be used by themselves or mixed with one another.

Examples of the diamines of formula (IV) are bis(m-aminophenyl)-methylphosphine oxide, bis(p-aminophenyl)methylphosphine oxide, bis(m-aminophenyl)phenylphosphine oxide, bis(3-aminopropyl)phenylphosphine oxide, 3-aminopropyl-4-aminobutyl-methyl-phosphine oxide, bis(m-aminophenyl)phosphinic acid and bis(p-aminophenyl)phosphinic acid.

Examples of diamines not containing phosphorous of formula (V) which can be associated with the diamines of formula (IV) in order to obtain copolyamides possessing units of formula (I), are hexamethylenediamine, m- or p-phenylenediamine, bis(m-aminophenyl)methane, bis(p-aminophenyl)methane and bis(m- or p-aminophenyl) oxide.

Phosporus-containing polyamides possessing units of formula (I) in which A is a methyl radical, $R_1$ and $R_2$ are p-phenylene radicals and R is a p-phenylene, octamethylene or tetramethylene radical have been described by T. Ya. MEDVED et al., J. Polym. Sci. USSR 5, 386 (1964); phosphorus-containing polyamides in which $R_1$ and $R_2$ are trimethylene or tetramethylene groups, R is a tetramaethylene or octamethylene group and A is a methyl or phenyl group have been prepared by J. PELLON et al., J. Polym. Sci., Al, 3561 (1963).

The phosphorus-containing polyamides possessing units of formula (I) in which A is a hydroxyl group, and which are hereafter called polyamides with phosphinic acid units, are obtained by polycondensation of the diacid or diacids of formula (III) with the diamine of formula:

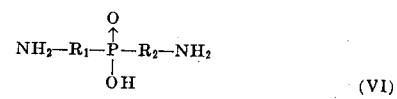

(VI)

In accordance with the conventional processes for the polycondensation of diacids and diamines. The process can be carried out either in homogeneous solution or by interfacial polycondensation. A particularly suitable process consists of carrying out the reaction in organic solution. For this, the diamine of formula (VI) is solubilized in the form of its salt with a tertiary organic base such as for example triethylamine and triethanolamine. Dimethylformamide, dimethylacetamide, dimethylsulphoxide, N-methylpyrrolidone or hexamethylphosphotriamide can be used as the solvent.

The temperature of the polycondensation reaction varies in accordance with the compounds which are brought together.

Depending on the case in question, the reaction can be carried out at ambient temperature or at higher temperatures up to 200° C. It can also be carried out at a temperature below 20° C.

The phosphorus-containing polyamides with phosphinic acid units are polycondensates of high softening point, generally above 200° C., which are soluble in polar organic solvents such as dimethylacetamide, N-methylpyrrolidone, hexamethylphosphotriamide and dimethylsulphoxide and in aqueous solutions of alkaline bases such as sodium hydroxide, potassium hydroxide, sodium carbonate, ammonia and tertiary organic bases.

The polyamides with units of formula (I) in which A is an alkoxy group are obtained by reaction of an alcohol with the polyamide with phosphinic acid chloride units, which is prepared by reaction of the polyamide with phosphinic acid units with a chlorinating agent such as thionyl chloride. In the same way, the polyamides with units of formula (I) in which A is a group

are prepared by reaction of ammonia or of an amine of formula HNR′R″ such as methylamine or dibutylamine with the polyamide with phosphinic acid chloride units.

The membranes of the invention are prepared in a manner which is in itself known, for example by casting a solution of the polyamide in a suitable solvent onto a support and then evaporating the solvent. It is also possible partially to remove the solvent and then to immerse the film with or without its support into water or into a nonsolvent for the polyamide. This immersion may be carried out cold or hot and for a period which depends on the nature of the polyamide and on the desired properties of the membrane. After this treatment the membrane can be dried or used directly. Regardless of the technique employed, a pore-forming agent, which can consist of a finely divided solid which is insoluble in the polyamide solvent but soluble in water or in a liquid which is a nonsolvent for the polymer, can be added to the polyamide solution. This pore-forming agent is removed from the film after casting by washing with an appropriate solvent. As an example of such an agent, sodium chloride and magnesium perchlorate may be mentioned. It is also possible to incorporate from 0.1 to 2 percent of a source of free radicals such as cumyl peroxide into the polyamide solution.

The membranes of the invention are particularly suitable for reverse osmosis and are of very great value for the desalination of sea water. They are particularly easy to use because they can be stored without special precautions.

The membranes currently used for the desalination of sea water are based on cellulose acetate. Despite the high flow rates which can be achieved with these, it has been found that they suffer from a double disadvantage: first, their sensitivity to hydrolysis greatly reduces their working life and requires rigorous control of the conditions of use; secondly, the degrees of rejection which they permit demand the use of desalination units with at least two stages. Against this, the membranes of the invention have a remarkable chemical resistance under sea water desalination conditions and, because of the excellent degrees of rejection which they provide, make it possible to work in single-stage units, which is of considerable industrial value.

The membranes according to the invention can be employed in a plane or tubular form, for example in the form of a bundle of hollow fibres.

The following Examples illustrate the invention.

EXAMPLE 1

A 15 percent solution of the polyterephthalamide of bis(m-aminophenyl)-methylphosphine oxide in dimethylacetamide, having a viscosity of 120 poises measured at 25° C., is prepared. This solution is cast onto a smooth glass plate 40 cm. × 22 cm., and introduced into an oven and kept there for 1 hour at 85° C. under a pressure of 1 mm. of mercury and then for 4 hours at 150° C. under the same pressure. The whole is then cooled and the film detached from the support. A transparent film 10 μ thick is thus obtained.

A disc 9 cm. in diameter is cut from this film and is positioned under a grid forming the bottom of a reverse osmosis apparatus consisting of a vertical stainless steel tube 51 cm. high and of 8 cm. internal diameter, comprising a gas inlet, a pressure release valve, a safety valve and a mechanical stirrer. A sintered metal disc is placed under the membrane and the whole is held fixed by a silicone elastomer joint and a metal base equipped with fixing screws and a device for removing the water passing through the membrane.

The efficiency of the membrane in reverse osmosis is measured as follows. 1.5 l. of an aqueous 3.5 g./l. sodium chloride solution are introduced into the apparatus. A pressure is then applied to the solution. The flow rate of the solution at the apparatus outlet is measured and the sodium chloride content of the solution is measured in the conventional manner. For the membrane described above, the flow rate is 4.52 l./m.²/24 hours and the degree of rejection of the salt is 87 percent under a pressure of 100 bars. Under the same conditions under a pressure of 50 bars, the flow rate of water is 2.76 l./m.²/24 hours and the degree of rejection of salt is 86%.

EXAMPLE 2

The membrane is prepared as in example 1 but from a solution containing 0.2 percent by weight of cumyl peroxide based on the polyterephthalamide. Under the same conditions of reverse osmosis as in example 1 and under a pressure of 50 bars, the membrane obtained shows a flow rate of 2 l./m.²/24 hours and a degree of rejection of salt of 98.7 percent.

EXAMPLE 3

A membrane is prepared as in example 1 but the film is first partially dried by heating to 85° C. under a reduced pressure of 1 mm. of mercury for 30 minutes and then immersed for 5 minutes in water maintained at 85° C. Under the same conditions of reverse osmosis as in example 2 the membrane obtained shows a flow rate of 75 l./m.²/24 hours and a degree of rejection of salt of 89.4 percent.

EXAMPLE 4

A phosphorus-containing copolyamide possessing a plurality of phosphonic acid units is prepared by polycondensation of terephthaloyl chloride with a mixture of 25 mol percent of bis(m-aminophenyl)phosphinic acid and 75 mol percent of bis(p-aminophenyl)methane, using the following procedure:

1.55 g. (0.62×10¹² mol) of bis(m-aminophenyl)phosphinic acid, 3.7 g. (1.8×10¹2 mol) of bis(p-aminophenyl)methane and 5. g. (2.5×10¹² mol) of terephthaloyl chloride in 50 cm.³ of N-methylpyrrolidone are reacted in the presence of 2 cm.³ of triethylamine for 3 hours at −10° C. The reaction mixture is added to water at 20° C. to precipitate the copolyterephthalamide. The whole is then acidified to pH =1 by adding hydrochloric acid. The polyamide is filtered off, washed with distilled water on the filter and dried at 100° C. under a pressure of 200 mm. of mercury. 8.1 g. of a polyamide with phosphinic acid units are obtained, having a specific viscosity of 0.89 measured at 25° C. on a 1 percent by weight solution in a mixture of N-methylpyrrolidone/hexamethyl-phosphotriamide (25/75 percent by weight).

A 10 μ thick membrane is prepared by casting a 10 percent strength solution in the mixture of N-methylpyrrolidone/hexamethylphosphotriamide (25/75) onto the glass plate of example 1, drying the film for half an hour at 80° C. and then immersing it for 5 minutes into water at 80° C. The membrane thus obtained is then used for carrying out a reverse osmosis in the apparatus of example 1 and under a pressure of 55 bars. The membrane yields a flow rate of 10 l./m.²/24 hours and a degree of rejection of salt of 93 percent.

EXAMPLE 5

A direct osmosis experiment is carried out in an apparatus consisting of a glass cell consisting of two cylindrical compartments separated by the semipermeable membrane, and of 100 cm.³ capacity. Each compartment is surmounted by a graduated glass tube seated on a ground neck. In each compartment stirring is provided by a magnetic stirrer.

A 10 μ thick membrane is prepared following the procedure of example 3. One of the compartments of the cell is filled with an aqueous sodium nitrate solution containing 1 mol/litre and the other compartment with a urea solution containing 0.5 mol/l. It is found that the urea solution passes into the nitrate solution. The flow rate is determined by the graduated tube in which the level of liquid rises progressively. This flow rate is 20 l./m.²/24 hours. The concentration of the solution passing through the membrane is the same as that of the initial urea solution.

EXAMPLE 6

The procedure of example 5 is followed, replacing the urea solution by an aqueous solution containing 0.33 mol/l. of urea and 0.33 mol/l. of sodium chloride. The flow rate of water through the membrane is 13 l./m.²/24 hours, the degree of rejection of NaCl is 80 percent and the concentration of urea in the solution passing through the membrane is 0.6 mol/litre.

EXAMPLE 7

The procedure of example 5 is followed but replacing the 1 mol/l. solution of NaNO₃ by a 5 mols/l. solution of NaNO₃ and replacing the urea solution by an 0.33 mol/l. solution of NaCl. The flow rate of water through the membrane is 99 l./m.²/24 hours with a degree of rejection of NaCL of 99.5%.

EXAMPLE 8

The procedure of example 7 is followed, but replacing the NaNO₃ solution by a 2 mols/l. solution of laevulose (fructose). The same results are obtained.

EXAMPLE 9

The procedure of example 5 is followed, replacing the urea solution by an aqueous solution containing 0.28 mol/l. of magnesium chloride. The flow rate of water is 15 l./m.²/24 hours and the degree of rejection of MgCl₂ is 97 percent.

When the MgCl₂ solution is replaced by an aqueous solution containing 0.025 mol/l. of MgSO₄ the flow rate of water is 52 l./m.²/24 hours with a degree of rejection of 96%.

EXAMPLE 10

A membrane is prepared as in example 4 using the polytetraphthalamide derived from the mixture of bis(m-aminophenyl)phosphinic acid/bis(p-aminophenyl)methane, and the osmosis experiment described in example 1 is then repeated with this membrane. The flow rate of water is 40 l./m.²/24 hours and the degree of rejection of NaCL is 99.5%.

EXAMPLE 11

The polyterephthalamide of bis(m-aminophenyl)phosphinic acid is prepared in the following manner: 400 cm.³ of dimethylformamide, 49.6 g. (0.2 mol) of bis(m-aminophenyl)phosphinic acid and 55 cm.³ of triethylamine are introduced into a 1 litre flask equipped with a stirrer. The temperature of the contents of the flask is raised to 40° C. to effect dissolution, and 40.6 g. (0.2 mol) of terephthaloyl chloride are then introduced over the course of 30 minutes. Stirring is continued for 3 hours at 20° C. and the mixture then left to stand for 12 hours. The contents of the flask are added to 2 l. of water and the whole is then acidified to pH =1 by adding hydrochloric acid. A precipitate is thus obtained which is filtered off, washed with water and dried at 100° C. under a pressure of 200 mm. of mercury.

71 g. of a product of softening point 290° C. are thus obtained, having a specific viscosity of 0.223 (1 percent strength solution in dimethylsulphoxide at 25° C.), and with an infrared spectrum agreeing with that of a product containing a plurality of groups of formula:

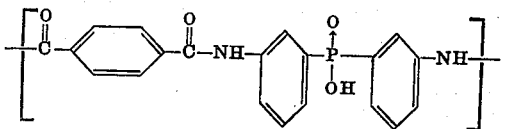

A 10 μ thick semipermeable membrane is prepared from a 15 percent strength solution in dimethylacetamide, following the procedure of example 3. A direct osmosis experiment carried out under the conditions of example 7 yields a flow rate of water of 100 l./m.²/24 hours and a degree of rejection of NaCl of 90 percent.

EXAMPLE 12

A copolyamide derived from terephthalic acid, methyl bis(m-aminophenyl)phosphine oxide and diaminodiphenylmethane is prepared in accordance with the following procedure. 170 cm.³ of dimethylacetamide, 9.9 g. (0.5×10¹¹ mol) of diaminodiphenylmethane, and 12.3 g. (0.5×10¹¹ mol) of methyl bis(m-aminophenyl)phosphine oxide are introduced into a 500 cm.³ three-necked flask equipped with a stirrer, a 100 cm.³ dropping funnel with a nitrogen inlet, an air condenser and a cooling device. The mixture is stirred at ambient temperature and under a nitrogen atmosphere until the diamines have dissolved. The contents of the flask are then cooled to −20° C., and 20.3 g. (10¹¹ mol) of terphthaloyl chloride and 30 cm.³ of dimethylacetamide are then added. The temperature rises to −8° C. These conditions are maintained for 4 hours and the contents of the flask are then allowed to heat up again to 20° C.

A sample of the limpid solution thus obtained is treated as follows: The polyamide is precipitated by adding the solution to water. After filtering, washing with water until the chloride ions have disappeared, and drying, a white polymer is obtained, having a specific viscosity of 1.5 measured on a 1 percent strength solution in a mixture of hexamethylphosphotriamide/diemthylacetamide (20/80 by weight) at 25° C. The solution obtained by polycondensation is filtered and degassed. Membranes were prepared from this solution in accordance with two techniques:

A. A 10 μ thick membrane is prepared by casing the solution obtained onto a glass plate, and completely removing the solvent by drying in a vacuum oven following the procedure of example 1.

B. A 10 μ thick membrane is prepared by casing the solution obtained onto a glass plate, followed by partial drying by heating to 80° C. under reduced pressure for a varying period and coagulation in water at 80° C. for 5 minutes. A series of membranes was thus prepared, for which the partial drying took a period of 30 minutes or 120 minutes.

The various membranes were used for the desalination of an aqueous sodium chloride solution containing 35 g./l. of NaCl, that is to say a salt concentration close to that of sea water. The results obtained are given in the table below (the apparatus used is that described in example 1).

| Type of membrane | Pressure used in bars | Degree of rejection in % | Flow rate in L./m.²/24 hr. |
|---|---|---|---|
| A | 75 | 98.8 | 0.4 |
| B with 30 mins. drying | 75 | 99.5 | 4.1 |
| B with 120 mins. drying | 75 | 99.8 | 5.7 |

We claim:

1. A semipermeable membrane made from a polyamide or copolyamide containing a plurality of units of the formula:

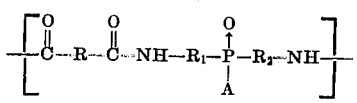

in which R, $R_1$ and $R_2$ are the same or different divalent hydrocarbon radicals and A represents a hydroxyl group, a monovalent hydrocarbon radical, a lower alkoxy group or a group of formula:

in which R' and R", which may be the same or different, represent hydrogen atoms or monovalent hydrocarbon radicals.

2. A membrane according to claim 1, in which R is alkylene of two to 10 carbon atoms, cyclohexylene, or phenylene, $R_1$ and $R_2$ are each alkylene of one to 10 carbon atoms, cyclohexylene, phenylene, halosubstituted phenylene, or (lower alkyl)-substituted phenylene, and A is hydroxyl, alkyl of one to 10 carbon atoms, cyclopentyl, cyclohexyl, phenyl, tolyl, benzyl, lower alkoxy, amino, alkyl-amino of one to 10 carbon atoms, or dialkylamino of one to 10 carbon atoms in each alkyl residue.

3. A membrane according to claim 1, in which the polyamide is the polyterephthalamide of bis(m-aminophenyl)-methylphosphine oxide.

4. A membrane according to claim 1, in which the polyamide is the polyterephthalamide of bis(m-aminophenyl)phosphinic acid.

5. A membrane according to claim 1, in which the copolyamide is the polyterephthalamide of a mixture of bis(m-aminophenyl)phosphinic acid and bis(m-aminophenyl)methane.

6. A process of direct or reverse osmosis in which the semipermeable membrane used is made from a polyamide or copolyamide containing a plurality of units of the formula:

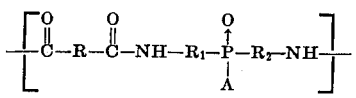

in which R, $R_1$ and $R_2$ are the same or different divalent hydrocarbon radicals and A represents a hydroxyl group, a monovalent hydrocarbon radical, a lower alkoxy group or a group of formula:

in which R' and R", which may be the same or different, represent hydrogen atoms or monovalent hydrocarbon radicals.

7. A process according to claim 6, in which an aqueous solution of a salt of a mineral acid is desalinated by reverse osmosis.

8. A process according to claim 7, in which the said salt is sodium chloride.

* * * * *